United States Patent
Magda et al.

(10) Patent No.: US 9,204,724 B2
(45) Date of Patent: Dec. 8, 2015

(54) SEAT ASSEMBLY

(71) Applicant: GM Global Technology Operations LLC, Detroit, MI (US)

(72) Inventors: Wesley M. Magda, Shelby Township, MI (US); Thomas Delano, Shelby Township, MI (US); Eduardo Barjud Bugelli, Farmington Hills, MI (US); Marcelo Bertocchi, Indaiatuba (BR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/902,152

(22) Filed: May 24, 2013

(65) Prior Publication Data

US 2014/0346833 A1    Nov. 27, 2014

(51) Int. Cl.
*A47C 3/00* (2006.01)
*B60N 2/48* (2006.01)
*B60N 2/70* (2006.01)
*B60N 2/28* (2006.01)

(52) U.S. Cl.
CPC . *A47C 3/00* (2013.01); *B60N 2/286* (2013.01); *B60N 2/4808* (2013.01); *B60N 2/4879* (2013.01); *B60N 2/7005* (2013.01)

(58) Field of Classification Search
CPC ...... A47C 3/00; B60N 2/4808; B60N 2/4879; B60N 2/7005; B60N 2/286
USPC ........... 297/410, 391, 397, 188.08, 92, 188.2, 297/118.01, 440.1, 188.01
See application file for complete search history.

(56) References Cited

U.S. PATENT DOCUMENTS

| | | | | |
|---|---|---|---|---|
| 3,512,832 A * | 5/1970 | Kage | ............................. | 297/410 |
| 3,910,630 A * | 10/1975 | Runyon et al. | ................... | 297/63 |
| 4,580,837 A * | 4/1986 | Bayley | ..................... | 297/362.12 |
| 5,029,928 A * | 7/1991 | Huber | ............................. | 296/63 |
| 5,294,182 A * | 3/1994 | Colasanti | ...................... | 297/467 |
| 5,551,750 A * | 9/1996 | Yoshimura | .................. | 297/250.1 |
| 6,203,104 B1 * | 3/2001 | Matsuo et al. | ..................... | 297/188.1 |
| 7,156,442 B2 * | 1/2007 | McManus et al. | ......... | 296/65.09 |
| 2009/0179476 A1 * | 7/2009 | Brunner | ........................ | 297/410 |
| 2011/0025115 A1 * | 2/2011 | Tanaka | .......................... | 297/391 |

* cited by examiner

Primary Examiner — Milton Nelson, Jr.
(74) Attorney, Agent, or Firm — BrooksGroup

(57) ABSTRACT

A number of variations may include a product including a seat assembly comprising a seat bottom assembly including a first attachment feature for attaching a headrest to the seat bottom assembly.

11 Claims, 4 Drawing Sheets

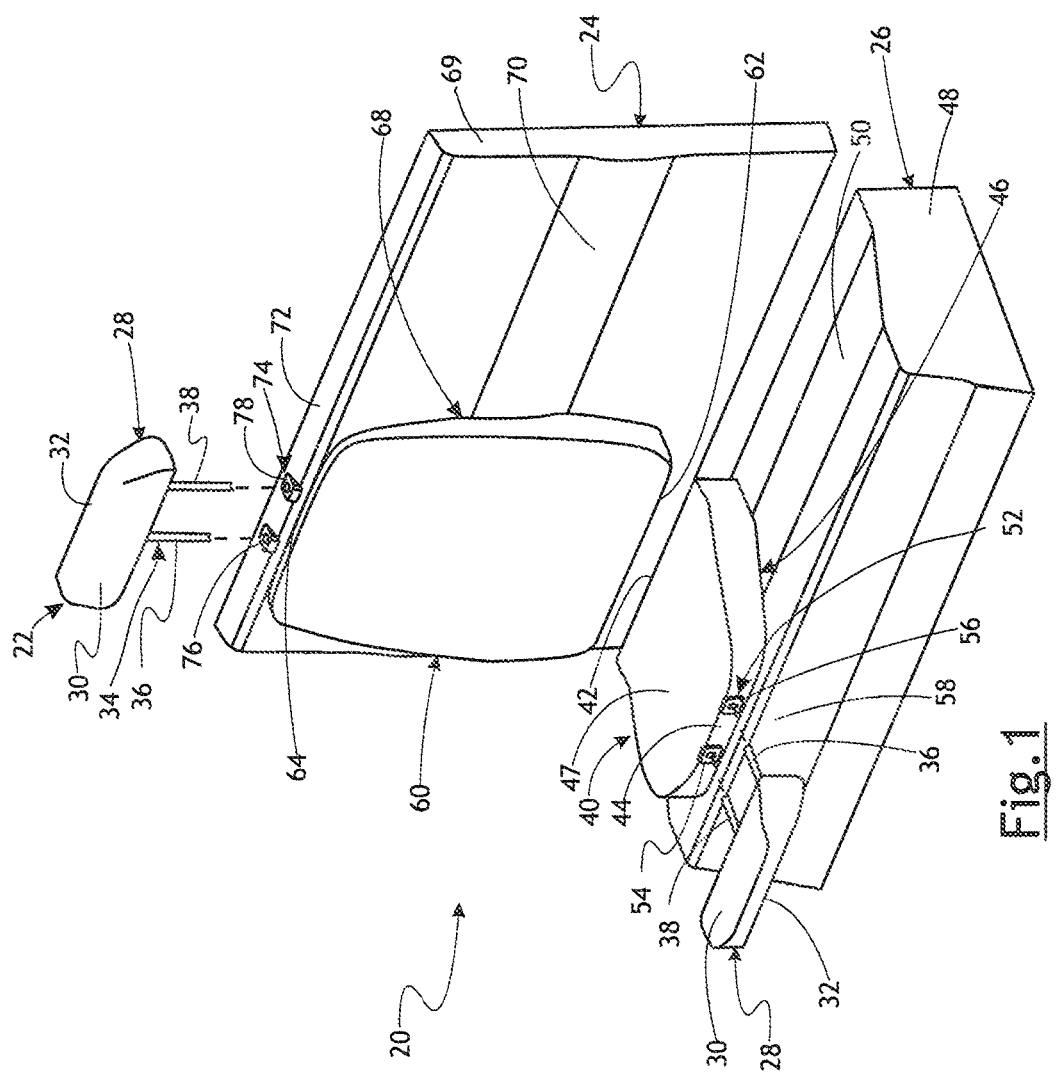

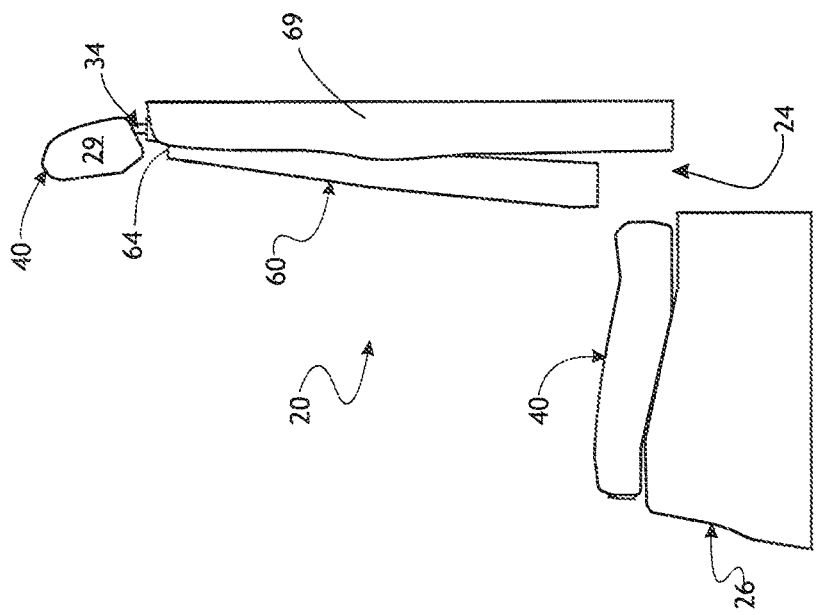
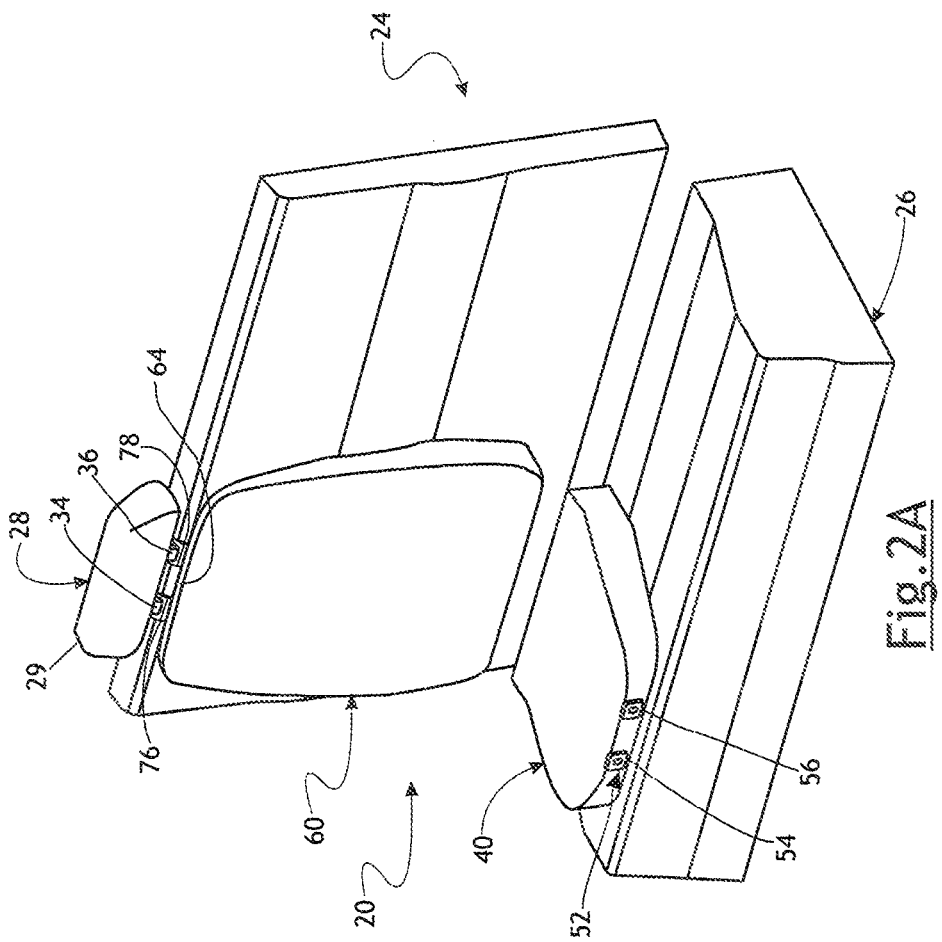

SEAT ASSEMBLY

TECHNICAL FIELD

The field to which the disclosure generally relates to includes vehicle seat assemblies.

BACKGROUND

Vehicles may be equipped with one or more seats for passengers.

SUMMARY OF ILLUSTRATIVE VARIATIONS

A number of variations may include a product including a seat assembly comprising a seat bottom assembly including a first attachment feature for attaching a headrest to the seat bottom assembly.

A number of variations may include a product comprising a seat bottom assembly, a first attachment feature formed in or extending from the seat bottom assembly, the first attachment feature being constructed and arranged to mate with a second attachment feature formed in or extending from a headrest.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations will become more fully understood from the detailed description and the accompanying drawings, wherein:

FIG. 1 is a perspective view of a seat assembly according to a number of variations.

FIG. 2A is a perspective view of a seat assembly with a headrest in a first position according to a number of variations.

FIG. 2B is a side view of a seat assembly with a headrest in a first position according to a number of variations.

DETAILED DESCRIPTION OF ILLUSTRATIVE VARIATIONS

Figure 3B:
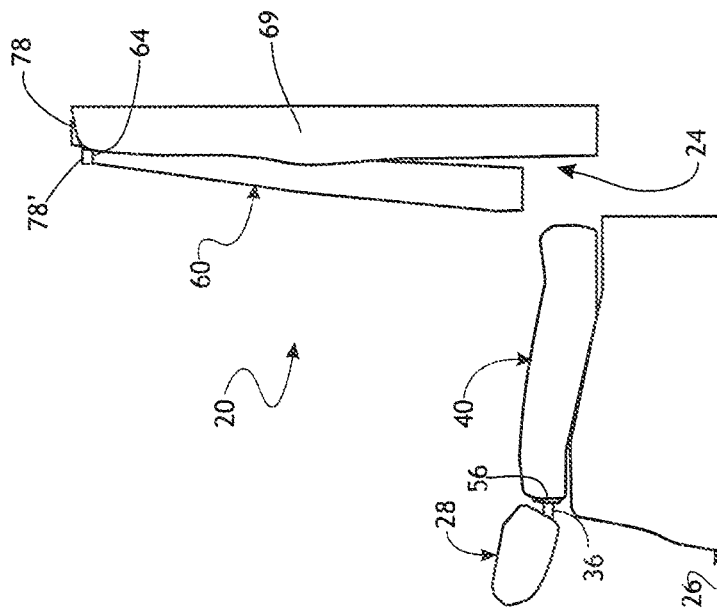
FIG. 3B is a side view of a seat assembly including a headrest in a second position according to a number of variations.
Figure 3A:
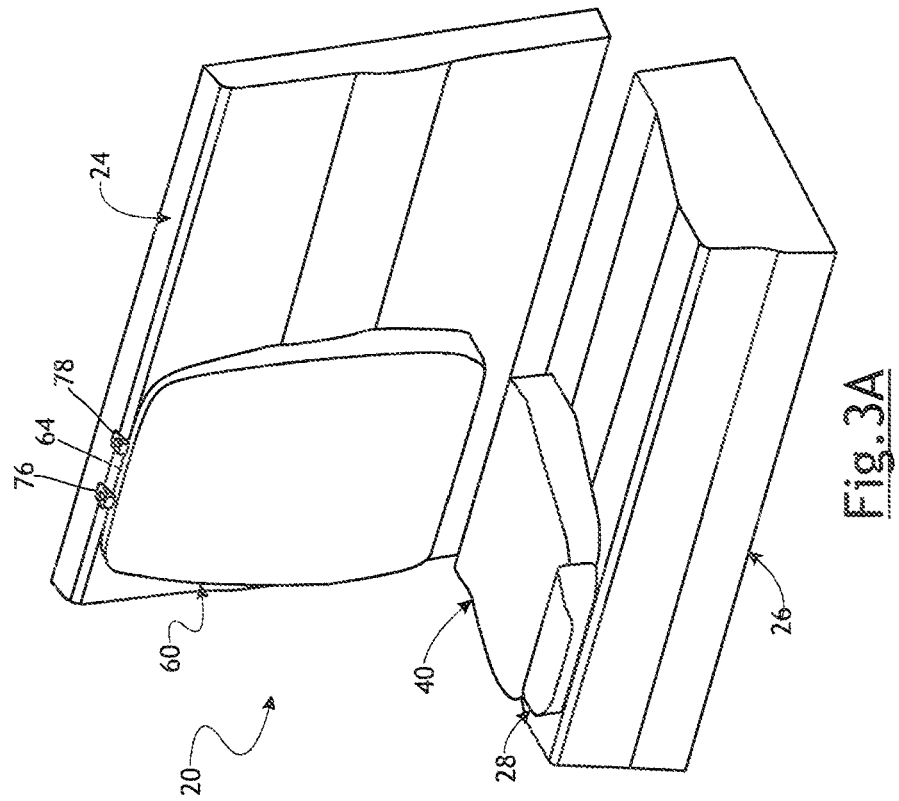
FIG. 3A illustrates a seat assembly including a headrest in a second position according to a number of variations.

The following description of the variations is merely illustrative in nature and is in no way intended to limit the scope of invention, its application, or uses.

A number of variations are illustrated in FIG. 1. A number of variations may include a product which may include a seat assembly 20. The seat assembly may include a headrest assembly 22, a seat back assembly 24 and/or a seat bottom assembly 26. The headrest assembly 22 may include a headrest 28 including a cushion 29 having a front face 30 and a back face 32. The headrest assembly 22 may also include a first attachment feature 34 formed in or extending from the headrest 28. In a number of variations, the first attachment feature 34 may include at least one of a first post 36 or second post 38 extending from the headrest 28. In a number of other variations, the first attachment feature 34 may include one or more post receiving pockets formed in the headrest.

The seat bottom assembly 26 may include a seat bottom cushion 40. The seat bottom cushion 40 may include a back edge 42 and opposite front edge 44. The seat bottom cushion 40 may include an underside face 46 and a top face 47. In a number of variations the seat assembly 26 may include the seat bottom cushion 40 with or without a seat bottom cushion support 48. When present, the seat bottom cushion support 48 may include a top face 50 on which the seat bottom cushion 40 may rest. Attachment features (not shown) may secure the underside face 46 of the seat bottom cushion 40 to the top face 50 of the seat bottom cushion support 48.

The seat bottom assembly 26 may include a second attachment feature 52 for mating with the first attachment feature 34 and securing the headrest 28 to the seat bottom assembly 26. In a number of variations, the second attachment feature 52 may be formed in or extend from the seat bottom cushion 40 or the seat bottom cushion support 48. For example, the second attachment feature 52 may be formed in or extend from a front face 58 of the seat bottom cushion support 48. In a number of variations, the second attachment feature 52 may include at least one of a first post receiving pocket 54 or second post receiving pocket 56. In other variations of the invention the second attachment feature 52 may include one or more posts extending from one of the seat cushion 40 or seat cushion support 48. Such posts may be retractable or may be pivotally connected so that, when desired, the post may be moved to a position wherein the posts do not protrude outward from the seat bottom cushion 40 or the seat bottom cushion support 48. In a number of variations the second attachment feature 52 may include a first post receiving pocket 54 and second post receiving pocket 56 formed in the front edge 44 of the seat back cushion 40.

The seat back cushion 60 may include a bottom edge 62 and a top edge 64. The seat back cushion 60 may also include a front face 60 and a back face 68. In a number of variations the seat back cushion 60 may be provided with or without a seat back cushion support 69. The seat back cushion support 69 may include a front face 70 and a top edge 72. Attachment features (not shown) may be provided on the back face 68 of the seat back cushion 60 to secure the seat back cushion 60 to the front face 70 of the seat back cushion support 69.

In a number of variations the seat back assembly 24 may include a third attachment feature 74 for mating with the first attachment feature 34 and securing the headrest 28 to the seat back assembly 24. In a number of variations the third attachment feature 74 may include at least one of a third post receiving pocket 76 or a fourth post receiving pocket 78. In a number of variations, the third post receiving pocket and/or the fourth post receiving pocket may be formed in the seatback cushion 60, for example along the top edge 64 thereof. FIG. 3B illustrates a post receiving pocket 78' formed in the seat back cushion 60. In a number of variations, the third post receiving pocket 76 and/or the fourth post receiving pocket 78 may be formed in the seat back cushion support 69, for example along the top edge 72 of the seatback cushion support 69. In a number of other variations the third attachment feature 74 may include one or more post extending from the seat back cushion 60 or the seatback cushion support 69 and may be constructed and arranged to be retractable or pivotally connected so as to be moved to a position where the posts do not protrude from the seat back cushion 60 or seatback cushion support 69.

Figure 4B:
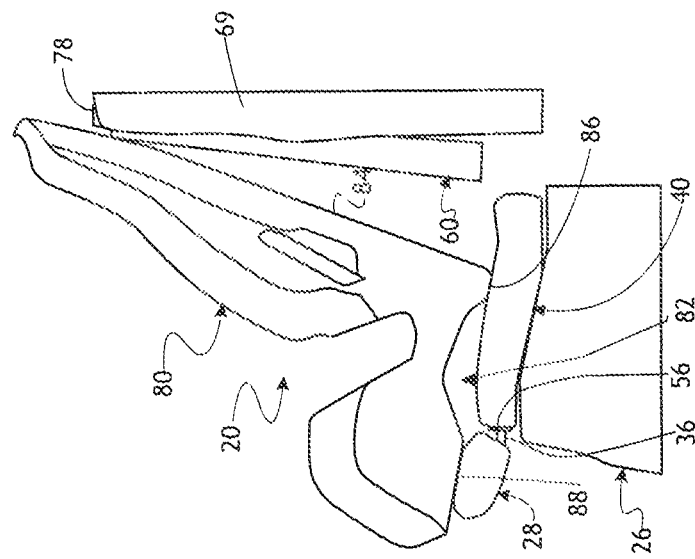
FIG. 4B is a side view illustrating an infant car seat positioned on a seat assembly including a headrest in a second position according to a number of variations.
Figure 4A:
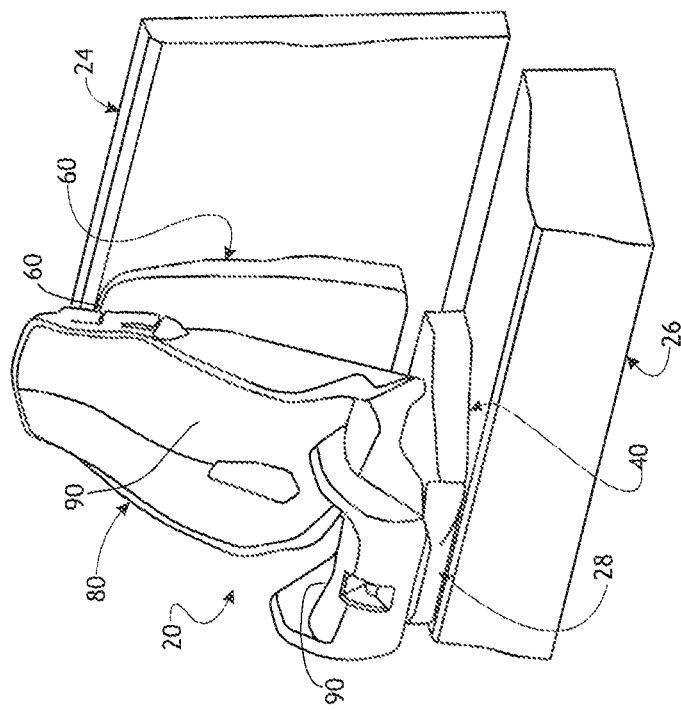
FIG. 4A illustrates an infant seat resting on a seat assembly with a headrest in a second position according to a number of variations.

Referring now to FIGS. 4A-4B, in a number of variations an infant car seat 80 may be provided and placed on the seat assembly 20. The infant car seat 80 may include a bottom 82 and a back portion 84. The bottom 82 may include a rear portion 86 and a front portion 88. The infant car seat 80 may include a front surface 90 on which an infant may arrest. The infant car seat 80 may be positioned with the headrest attached to the seat bottom assembly 26, for example wherein the headrest 28 is attached to the seat bottom cushion 60 by post receiving pocket 56 or the seat bottom support 69 by a post receiving pocket (not shown). The bottom 82 of the infant car seat 80 may rest on both the top face 74 of the seat cushion 60 and the front face 30 of the headrest 28 (or rear face 32 if the headrest 28 is flipped over). In a number of variations a rear portion 68 of the bottom 82 of the infant car seat 80 may rest on the top surface 74 of the seat cushion and a front portion 88 of the bottom 82 of the infant car seat 80 may rest on the headrest 28, for example on the front face 30 thereof.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a seat assembly comprising a seat bottom assembly including a first attachment feature for attaching a headrest to the seat bottom assembly.

Variation 2 may include a product as set forth in Variation 1 wherein the first attachment feature comprises at least a first post receiving pocket formed in the seat bottom assembly.

Variation 3 may include a product as set forth in Variation 1 wherein the first attachment feature includes a first post receiving pocket and a second post receiving pocket each formed in the seat bottom assembly.

Variation 4 may include a product as set forth in Variation 1, of any of the preceding Variations, wherein the seat bottom assembly comprises a seat bottom cushion.

Variation 5 may include a product as set forth in Variation 1, of any of the preceding Variations, wherein the seat bottom assembly includes a seat bottom cushion and a seat bottom cushion support attached to the seat bottom cushion.

Variation 6 may include a product as set forth in Variation 5, of any of the preceding Variations, wherein the first attachment feature is formed in or extends from at least one of the seat bottom cushion or the seat bottom cushion support.

Variation 7 may include a product as set forth in Variation 1, of any of the preceding Variations, further comprising a headrest assembly including a second attachment feature mateable with the first attachment feature.

Variation 8 may include a product as set forth in Variation 7, of any of the preceding Variations, wherein the headrest assembly includes a headrest and wherein the second attachment feature includes at least a first post extending from the headrest, and wherein the first attachment feature includes a first post receiving pocket for mating with the at least a first post extending from the headrest.

Variation 9 may include a product as set forth in Variation 8, of any of the preceding Variations, wherein the seat bottom assembly comprises a seat bottom cushion and wherein the first post receiving pocket is formed in the seat bottom cushion.

Variation 10 may include a product as set forth in Variation 8, of any of the preceding Variations, wherein the seat bottom assembly comprises a seat bottom cushion attached to a seat bottom cushion support and wherein the first post receiving pocket is formed in the seat cushion support.

Variation 11 may include a product as set forth in Variation 1, of any of the preceding Variations, for wherein the seat assembly further comprises a seat back assembly and a third attachment feature formed in the seat back assembly, wherein the third attachment feature is mateable with the first attachment feature.

Variation 12 may include a product as set forth in Variation 11, of any of the preceding Variations, wherein the third attachment feature comprises at least a third post receiving pocket formed in the seat back assembly.

Variation 13 may include a product as set forth in Variation 11, of any of the preceding Variations, wherein the third attachment feature comprises a third post receiving pocket and a fourth post receiving pocket each formed in the seat back assembly.

Variation 14 may include a product as set forth in Variation 11, of any of the preceding Variations, wherein the seat back assembly includes a seat back cushion and wherein the third attachment feature is formed in or extends from the seat back cushion.

Variation 15 may include a product as set forth in Variation 11, of any of the preceding Variations, wherein the seat back assembly includes a seat back cushion attached to the seat back cushion support and wherein the third attachment feature is formed in or extends from the seat back cushion support.

Variation 16 may include a product as set forth in Variation 15, of any of the preceding Variations, wherein the seat back cushion support includes a front face having the seat back cushion attached thereto and wherein the seat back cushion support includes a top edge, and wherein the third attachment feature comprises at least a third pocket formed in the top edge of the seat back cushion support.

Variation 17 may include a product as set forth in Variation 16, of any of the preceding Variations, wherein the third attachment feature further comprises a forth post receiving pocket formed in the top edge of the seat back cushion support.

Variation 18 may include a product comprising: a seat assembly comprising a seat bottom assembly including a first attachment feature for attaching a headrest to the seat bottom assembly; wherein the first attachment feature includes a first post receiving pocket and a second post receiving pocket each formed in the seat bottom assembly; a headrest assembly including a second attachment feature mateable with the first attachment feature, wherein the second attachment feature a headrest and a first post and a second post extending from the head rest; a seat back assembly comprising a seat back cushion support having a front face and a the seat back cushion attached to the front face of the seat back cushion support, and wherein the seat back cushion support includes a top edge, and a third attachment feature mateable with the first attachment feature, and wherein the third attachment feature comprises at least a third pocket and a fourth post receiving pocket each formed in the top edge of the seat back cushion support.

The above description of select examples of the invention is merely exemplary in nature and, thus, variations or variants thereof are not to be regarded as a departure from the spirit and scope of the invention.

What is claimed is:

1. A product comprising:
a seat assembly comprising a seat bottom assembly including a first attachment feature for attaching a headrest to the seat bottom assembly, the seat bottom assembly including a seat bottom cushion, the seat assembly having a seat back assembly, the seat bottom cushion having a back edge adjacent the seat back assembly and a front edge of the seat bottom cushion opposite the back edge and furthest from the back assembly, the seat bottom cushion having a top face extending from the back edge to the front edge, further comprising a headrest assembly including a headrest having a second attachment feature mateable with the first attachment feature, the headrest attached to the seat bottom assembly by the first attachment feature and the second attachment feature, and an infant car seat having a bottom portion and back portion wherein the bottom portion of the infant car seat rest on and is supported by the seat bottom assembly and the headrest attached thereto.

2. A product as set forth in claim 1 wherein the first attachment feature comprises at least a first post receiving pocket formed in the seat bottom assembly.

3. A product as set forth in claim 1 wherein the first attachment feature includes a first post receiving pocket and a second post receiving pocket each formed in the seat bottom assembly.

4. A product as set forth in claim 1 further comprising a seat bottom cushion support attached to the seat bottom cushion.

5. A product as set forth in claim 1 wherein the second attachment feature includes at least a first post extending from the headrest, and wherein the first attachment feature includes a first post receiving pocket for mating with the at least a first post extending from the headrest.

6. A product as set forth in claim 5 wherein the first post receiving pocket is formed in the seat bottom cushion.

7. A product as set forth in claim 1 further comprising a third attachment feature formed in the seat back assembly, wherein the third attachment feature is mateable with the second attachment feature.

8. A product as set forth in claim 7 wherein the third attachment feature comprises at least a third post receiving pocket formed in the seat back assembly.

9. A product as set forth in claim 7 wherein the third attachment feature comprises a third post receiving pocket and a fourth post receiving pocket each formed in the seat back assembly.

10. A product as set forth in claim 7 wherein the seat back assembly includes a seat back cushion and wherein the third attachment feature is formed in or extends from the seat back cushion.

11. A combination comprising:
a seat assembly comprising a headrest assembly and a seat bottom assembly including a first attachment feature for attaching the headrest assembly to the seat bottom assembly;
wherein the first attachment feature includes a first post receiving pocket and a second post receiving pocket each formed in the seat bottom assembly;
the headrest assembly including a second attachment feature mateable with the first attachment feature, wherein the second attachment feature comprises a first post and a second post extending from the headrest assembly;
a seat back assembly comprising a seat back cushion support having a front face and a seat back cushion attached to the front face of the seat back cushion support, and wherein the seat back cushion support includes a top edge, and a third attachment feature mateable with the second attachment feature, and wherein the third attachment feature comprises at least a third post receiving pocket and a fourth post receiving pocket each formed in the top edge of the seat back cushion support;
the headrest assembly attached to the seat bottom assembly by the first attachment feature and the second attachment feature, and an infant car seat having a bottom portion and back portion wherein the bottom portion of the infant car seat rests on and is supported by the top face of the seat bottom cushion and the headrest assembly.

* * * * *